United States Patent
Cecchini et al.

(10) Patent No.: US 10,427,805 B2
(45) Date of Patent: Oct. 1, 2019

(54) DEPLOYABLE INFLATABLE WING

(71) Applicant: AIRBUS DEFENCE AND SPACE SAS, Les Mureaux (FR)

(72) Inventors: Guillaume Cecchini, Blanquefort (FR); Hervé Guenat, Le Taillan-Medoc (FR); Claude-Emile Mahy, Cauderan (FR)

(73) Assignee: ARIANEGROUP SAS, Paris (FR)

( * ) Notice: Subject to any disclaimer, the term of this patent is extended or adjusted under 35 U.S.C. 154(b) by 394 days.

(21) Appl. No.: 15/103,121

(22) PCT Filed: Dec. 18, 2014

(86) PCT No.: PCT/EP2014/078562
§ 371 (c)(1),
(2) Date: Jun. 9, 2016

(87) PCT Pub. No.: WO2015/091858
PCT Pub. Date: Jun. 25, 2015

(65) Prior Publication Data
US 2016/0304220 A1    Oct. 20, 2016

(30) Foreign Application Priority Data

Dec. 20, 2013    (FR) .................... 13 63167

(51) Int. Cl.
*B64G 1/22*    (2006.01)
*B64G 1/44*    (2006.01)
*B64G 1/66*    (2006.01)
*B64G 1/40*    (2006.01)
*B64G 1/62*    (2006.01)

(52) U.S. Cl.
CPC ............. *B64G 1/222* (2013.01); *B64G 1/407* (2013.01); *B64G 1/44* (2013.01); *B64G 1/66* (2013.01); *B64G 1/62* (2013.01); *B64G 2001/224* (2013.01)

(58) Field of Classification Search
CPC .......... B64G 1/222; B64G 1/407; B64G 1/44; B64G 1/66; B64G 2001/224; B64G 1/62
See application file for complete search history.

(56) References Cited

U.S. PATENT DOCUMENTS 2,810,391 A    10/1957    Jones, Jr.
3,538,928 A    11/1970    Price et al.
(Continued)

FOREIGN PATENT DOCUMENTS

CH    566235    7/1988
DE    19825785    12/1999
(Continued)

OTHER PUBLICATIONS

International Search Report, International Application No. PCT/EP2014/078562, dated Mar. 20, 2015.

*Primary Examiner* — Assres H Woldemaryam
(74) *Attorney, Agent, or Firm* — Gottlieb, Rackman & Reisman, PC

(57) ABSTRACT

The invention relates to a space wing, produced by means of a diaphragm forming a polygonal surface provided with an inflatable structure which includes ribs extending over the diaphragm along diagonals of the diaphragm and passing through a central point of the diaphragm. The inflatable structure includes at least one film strip, the perimeter of which adheres onto the diaphragm such as to form an inflatable space with the diaphragm.

18 Claims, 7 Drawing Sheets

(56) References Cited

U.S. PATENT DOCUMENTS

| | | | |
|---|---|---|---|
| 5,044,579 A | 9/1991 | Bernasconi et al. | |
| 5,311,706 A | 5/1994 | Sallee | |
| 6,568,640 B1 | 5/2003 | Barnett | |
| 6,585,193 B1 | 7/2003 | Kustas et al. | |
| 6,647,668 B1 | 11/2003 | Cohee et al. | |
| 9,550,584 B1 * | 1/2017 | Harvey | B64G 1/222 |
| 2004/0046085 A1 * | 3/2004 | Veal | B64G 1/222 |
| | | | 244/172.6 |
| 2006/0192054 A1 * | 8/2006 | Lachenmeier | B64B 1/14 |
| | | | 244/145 |
| 2010/0166988 A1 | 7/2010 | Defoort et al. | |

FOREIGN PATENT DOCUMENTS

| | | |
|---|---|---|
| WO | 0061894 | 10/2000 |
| WO | 2006024805 | 3/2006 |
| WO | 2007096289 | 8/2007 |
| WO | 2008006835 | 1/2008 |

\* cited by examiner

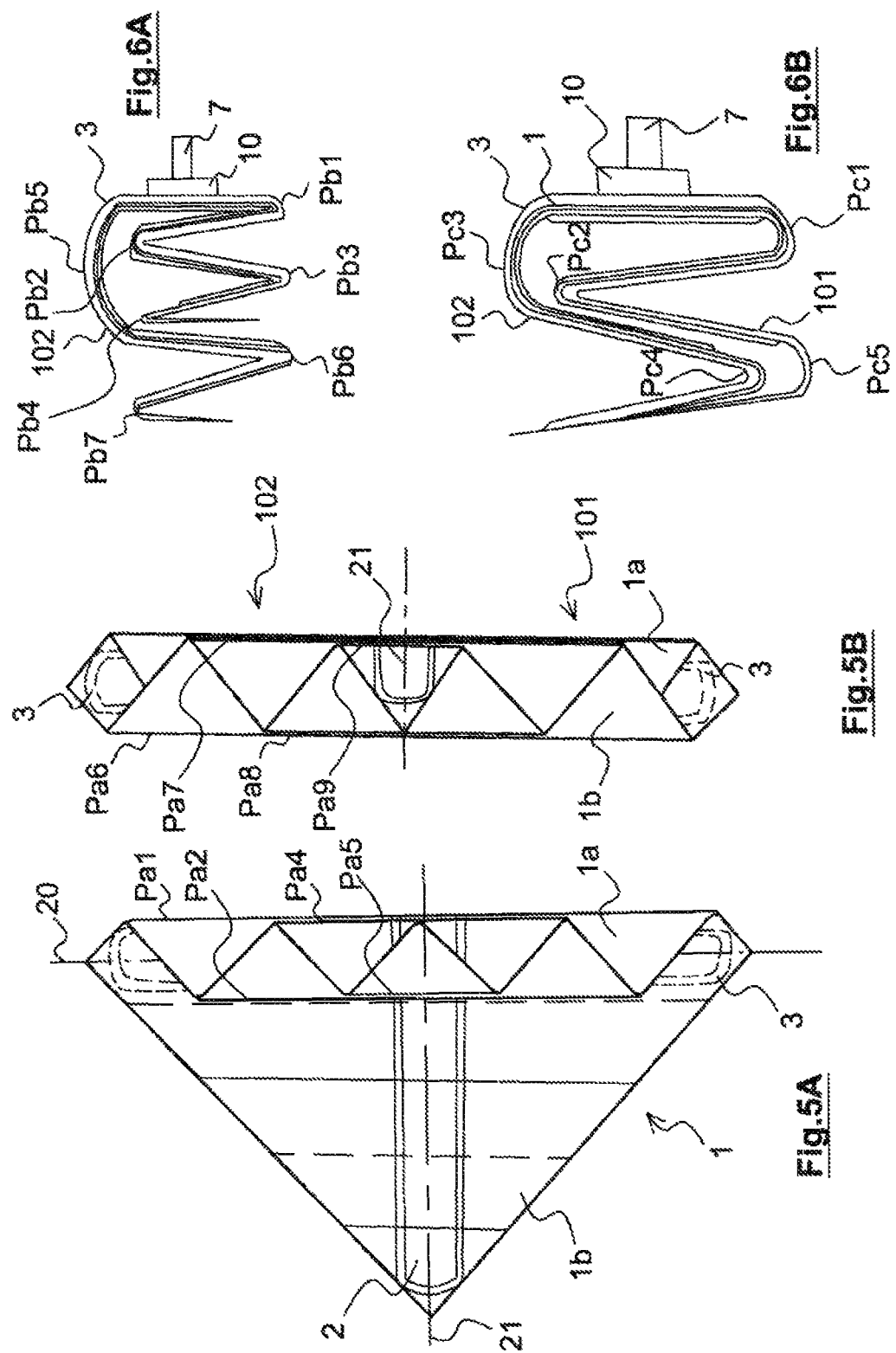

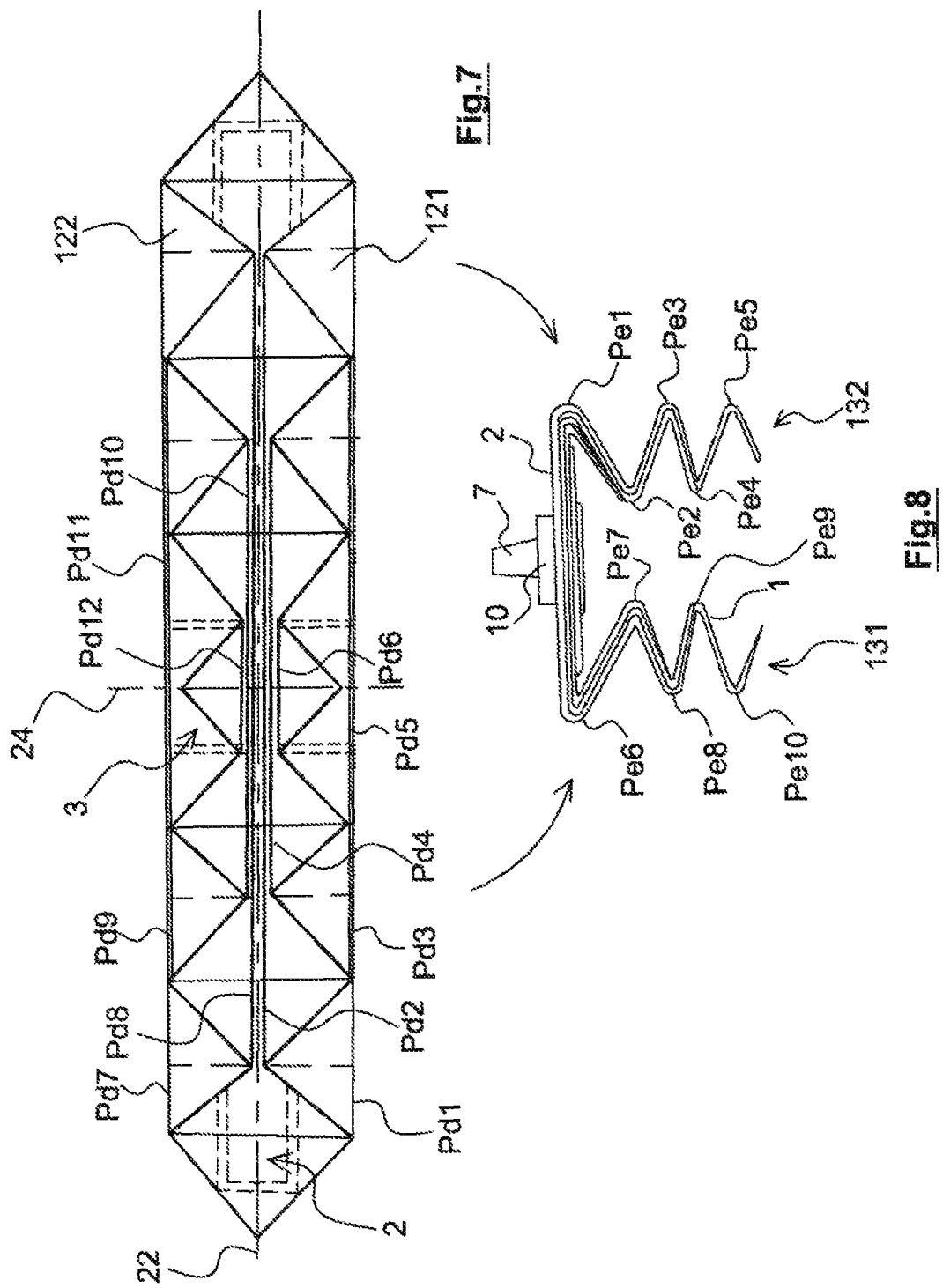

DEPLOYABLE INFLATABLE WING

CROSS REFERENCE TO RELATED APPLICATIONS

This application is the National Stage of International Application No. PCT/EP2014/078562, having an International Filing Date of 18 Dec. 2014, which designates the United States of America, and which International Application was published under PCT Article 21(2) as WO Publication No. 2015/091858 A1, and which claims priority from and the benefit of French Application No. 1363167, filed 20 Dec. 2013, the disclosures of which are incorporated herein by reference in their entireties.

BACKGROUND

1. Field

The presently disclosed embodiment relates to the field of ultralight structures which are able to be fitted onto satellites or space stations. More specifically, the presently disclosed embodiment relates to a wing consisting of a membrane which is deployed by the inflation of ribs from a folded state.

2. Brief Description of Related Developments

Structures which are deployed by inflation are known in the space field and, for example, the document U.S. Pat. No. 5,311,706 A discloses various geometries of ultralight inflatable space structures which are called gossamer structures.

The document WO2006/024805 discloses a multi-layered wall for a structure of an inflatable gossamer device and the document WO2007/096289 discloses an airbrake sail which is deployed using an inflatable mast.

SUMMARY

The presently disclosed embodiment aims to produce a wing, compact when it is folded, which is easily deployed and which does not risk being blocked or entangled when deployed.

In order to achieve this, the presently disclosed embodiment proposes a space wing produced by means of a membrane forming a polygonal surface provided with an inflatable structure for which the inflatable structure comprises ribs extending over the membrane along diagonals of the membrane and passing through a central point of the membrane.

The inflatable structure comprises at least one film strip, the contour thereof being adhesively bonded to the membrane so as to form an inflatable volume with the membrane. This inflatable volume produces the extension ribs of the membrane.

According to a first aspect, the polygonal membrane is unfolded by means of an inflatable structure comprising at least two film strips, a first strip being adhesively bonded to a first face of the membrane on a first diagonal of the membrane, said first strip and the membrane below said strip forming a first inflatable tube, and a second strip being adhesively bonded to a second face of the membrane opposing said first face on one or more second diagonals of the membrane, the second strip and the membrane below this strip forming a second inflatable tube.

Advantageously, the membrane is perforated at the center of the polygon to place the first and second inflatable tubes in communication with one another.

According to one particular aspect, at least one film strip comprises a cross-shaped cut-out adhesively bonded to a face of the membrane on diagonals of the membrane, said cross-shaped strip and the membrane below this strip forming an inflatable tube.

According to one particular aspect, the inflatable structure is produced from a square membrane and comprises two film strips, a first strip being adhesively bonded to a first face of the membrane on a first diagonal of the square surface, said first strip and the membrane below said strip forming a first inflatable tube and a second strip being adhesively bonded to a second face of the membrane opposing said first face on the second diagonal of the square surface, the second strip and the membrane below said strip forming a second inflatable tube.

According to a second aspect, the inflatable structure with the square membrane is produced with a cross-shaped film strip adhesively bonded to a face of the membrane on the diagonals of the square surface, said cross-shaped strip and the membrane below said strip forming an inflatable tube.

Advantageously, the inflatable structure comprises an inflating device in the center of the inflatable structure.

More particularly, the inflating device comprises a valve and a tubular end piece perpendicular to the membrane and which is fixed to a strip.

The tubular end piece advantageously extends a telescopic mast for deployment of the wing.

The wing is, for example, a constituent part of an antenna, a solar panel, an airbrake sail, a solar sail, a sun shield of a spacecraft.

The disclosed embodiment further relates to a method for folding a space wing produced by means of a membrane forming a polygonal surface fixed to an inflatable structure, the inflatable structure comprising to this end a plurality of bands extending along diagonals of the membrane, the method comprising a first series of foldings of the membrane in the manner of a concertina, parallel to a first diagonal of the membrane until a band is produced about said first diagonal, then a second series of foldings of the membrane in the manner of a concertina, perpendicular to said first diagonal until an overlapping surface of the strips on the membrane is left free, said overlapping surface bearing an end piece for inflating the device.

According to a first aspect, as the first series of foldings is carried out parallel to the first diagonal, said method starts by folding a first wing of the membrane in the manner of a concertina on a first side of said first diagonal by means of foldings which fold said wing on a band having a width of the strip about said first diagonal and the method is terminated by folding the second wing in the manner of a concertina on the other side of the first diagonal by means of foldings which fold the second wing above the first folded wing.

According to a second aspect, the first series of foldings is carried out parallel to the axis of the first diagonal and the wings are folded together in the manner of a concertina.

According to a third aspect, as one increment corresponds to the width of a strip arranged on the first diagonal, the first series of foldings comprises the folding of a first wing along the folds in the manner of a concertina parallel to the first diagonal on a band having a width of a ½ increment on a first side of the first diagonal, the first series of foldings comprising the folding of a second wing along the folds in the manner of a concertina on a band having a width of a ½ increment on a second side of the first diagonal so that the two wings are folded side-by-side.

According to a first aspect, the second series of foldings is carried out perpendicular to the first diagonal, the arms of the band on either side of the second diagonal being folded together in the manner of a concertina.

According to a first variant, the second series of foldings is carried out parallel to the second diagonal and comprises the folding of a first arm along the folds in the manner of a concertina and then the folding of a second arm along the folds on the first arm in the manner of a concertina.

According to a second variant, the second series of foldings comprises a separate folding parallel to the arm on either side of the first diagonal along the folds in the manner of a concertina.

BRIEF DESCRIPTION OF THE DRAWINGS

Further features and advantages of the disclosed embodiment will become apparent from reading the following description of a non-limiting aspect of the disclosed embodiment with reference to the drawings, in which:

FIGS. 5A and 5B show a view from below of two steps of a first aspect of a first series of foldings of the wing of the disclosed embodiment;

FIGS. 6A and 6B—show views from the side of two alternatives of a second series of foldings of the wing of the disclosed embodiment;

FIG. 7 shows a view from below of a second aspect of a first series of foldings of the wing of the disclosed embodiment;

FIG. 8 shows a view from the side of a third aspect of a second series of foldings of the wing of the disclosed embodiment;

DETAILED DESCRIPTION

The presently disclosed embodiment relates to membrane devices which are deployed by inflation in space.

Said devices comprise a membrane which is previously folded during the launching of the satellite or spacecraft and which is deployed once the spacecraft is in space so as to obtain a large surface, such as for example a planar satellite airbrake sail, a solar sail or a solar panel.

The advantage of such devices is that no other element which is external to the sail than an inflation system is used in the deployment of the sail.

One particular object of the disclosed embodiment is that the folded surface takes up the smallest possible space whilst guaranteeing full deployment with a high rate of success of the deployment.

One particular aspect of the disclosed embodiment is a square deorbiting sail for a satellite, said sail being folded in the manner of a concertina along its diagonals.

Figure 1:
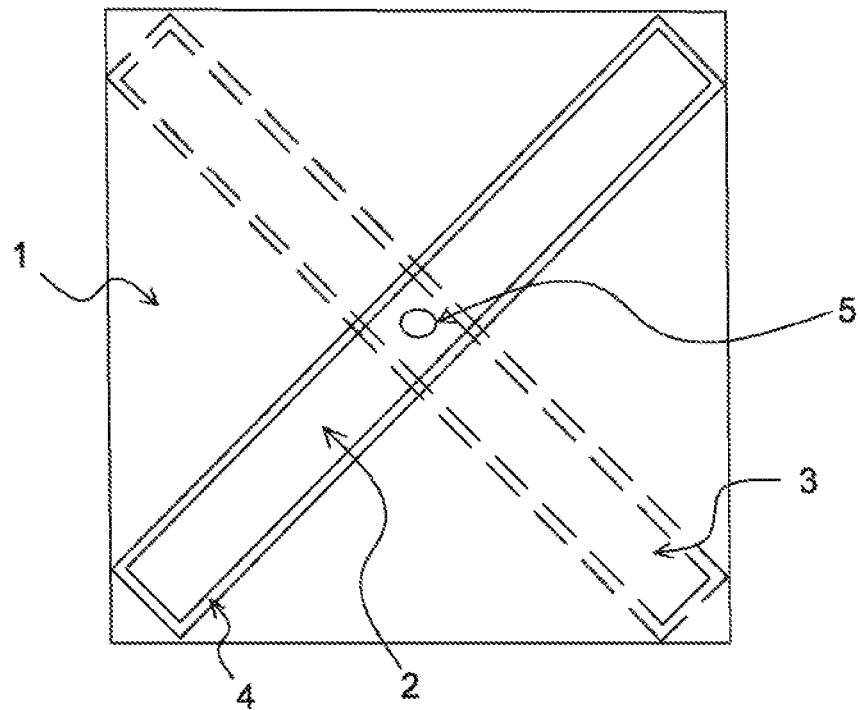
FIG. 1 shows a view from above of a first aspect of a wing of the disclosed embodiment.

The wing of the disclosed embodiment shown in FIG. 1 is a space wing produced by means of a membrane 1 forming a square surface. The membrane may be produced, in particular, by a polyamide film developed by the manufacturer DuPont and marketed under the tradename Kapton and having a thickness of 7.5 µm, with a coating to protect against atomic oxygen of the $SiO_x$ type, where x ranges between 1 and 2.

The wing is provided with an inflatable structure which extends along the diagonals of the membrane.

Figure 3:
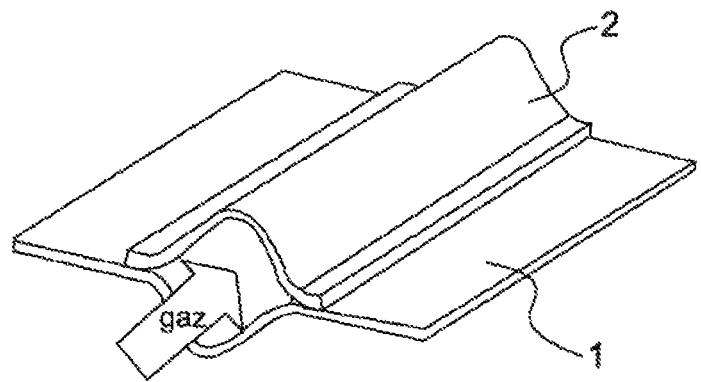
FIG. 3 shows a detail of an inflatable structure of the wing of the disclosed embodiment.

The inflatable structure of FIG. 1 comprises two film strips 2, 3, the contour 4 thereof being adhesively bonded to the membrane so as to form an inflatable volume with the membrane, shown in particular in FIG. 3. The strips are also produced using a polyamide film known by the tradename Kapton.

A first strip 2 is adhesively bonded to a first face of the membrane 1, for example the upper face according to the Figure, on a first diagonal of the square surface, said first strip 2 and the membrane 1 below this strip forming a first inflatable tube.

The adhesive bonding of the contour 4 of the strip to the membrane is, for example, produced by an adhesive of the CV 1142 type from the manufacturer Nusil.

A second strip 3 shown in dashed lines is adhesively bonded to the lower face of the membrane 1 opposing said first face on the second diagonal of the square surface.

The second strip 3 and the membrane 1 below this strip form a second inflatable tube.

To ensure communication between the inflatable tubes and to permit an inflation in the region of a single gas inlet point the membrane 1 is perforated in the center of the square 5 to place the first and second inflatable tubes in communication with one another.

Figure 4:
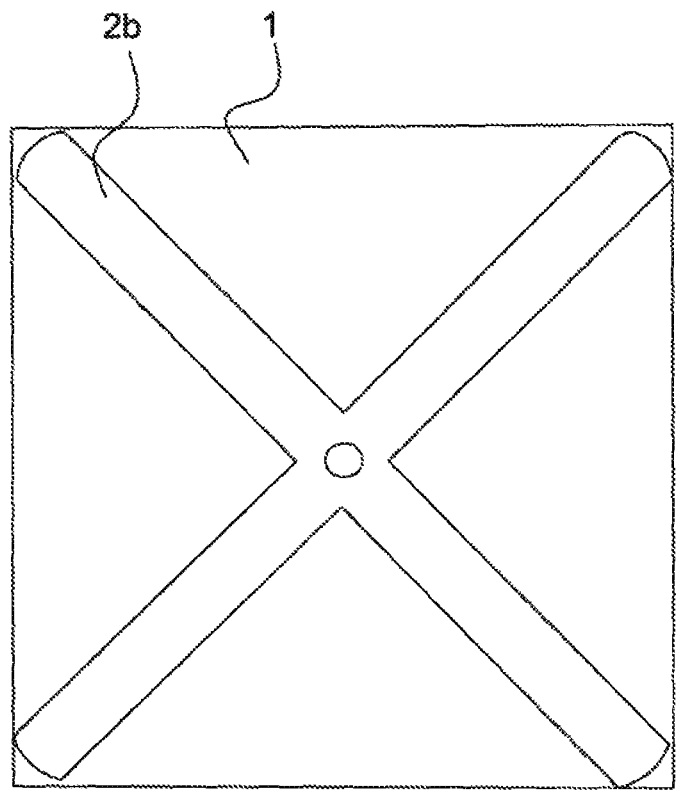
FIG. 4 shows a view from above of a second aspect of a wing of the disclosed embodiment.

FIG. 4 is an alternative aspect wherein the inflatable structure is produced by a cross-shaped film strip 2b adhesively bonded to the diagonals of the square surface of the membrane 1.

The cross-shaped strip 2b and the membrane 1 below this strip form a single inflatable tube on a single side of the membrane.

Figure 2:
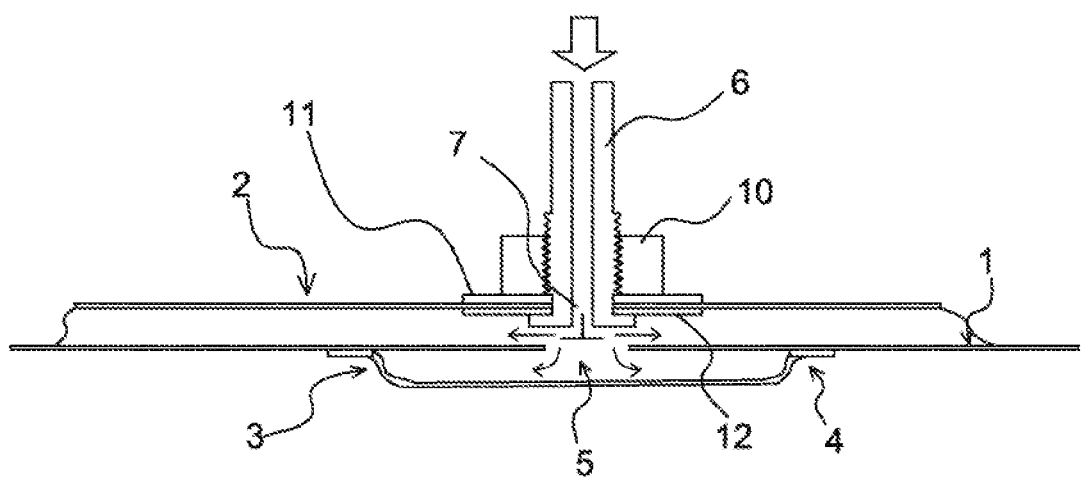
FIG. 2 shows a sectional view from the side of a central part of the wing of FIG. 1.

According to FIG. 2, the inflatable structure comprises an inflation interface 7 in the center of the square surface. This interface may, in particular, be a valve.

The inflation valve is in this case a valve which allows gas to pass only in the direction of inflation of the inflatable structure.

The valve 7 is arranged at the end of the end piece 6 provided with a thread for receiving a nut 10 which fixes the valve 7 to the first strip 2 or in the case of the embodiment of FIG. 4 to the strip 2'.

Gaskets 11, 12 bear against either side of the strip in order to achieve a seal.

In an alternative aspect, an adhesive bonding of a flange of the valve may be provided.

Figure 10:
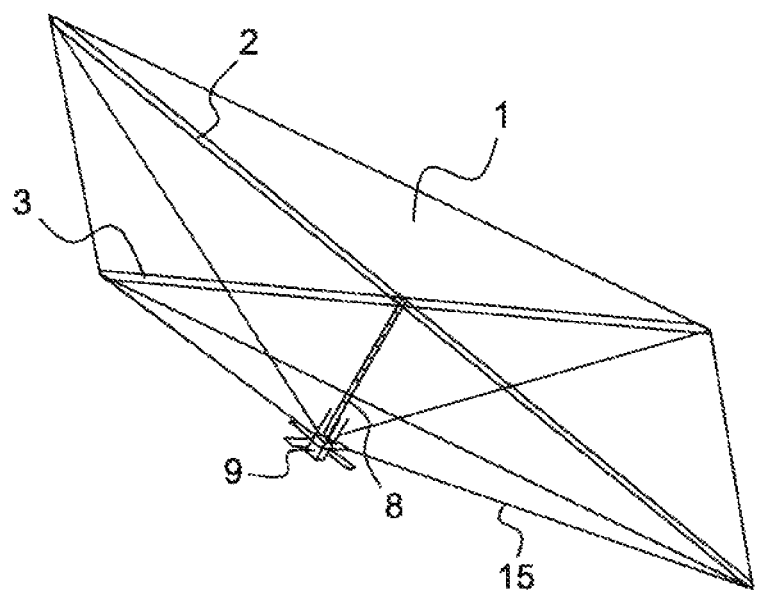
FIG. 10 shows a perspective view of the satellite of FIG. 9 with the wing deployed.

As shown in FIG. 10, the end piece may be arranged as an extension of a telescopic mast for deploying the wing from a spacecraft 9.

Figure 9:
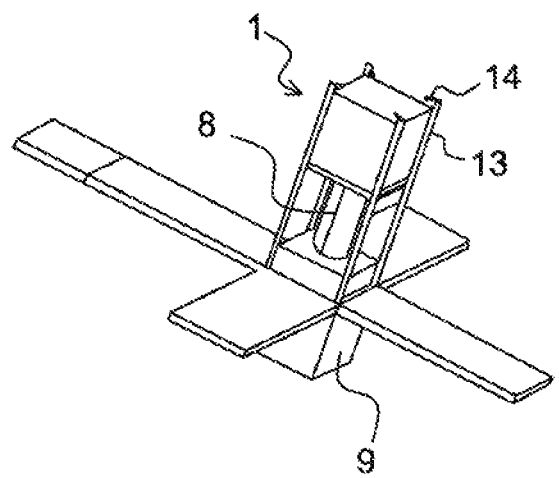
FIG. 9 shows a perspective view of an example of a satellite provided with a wing folded up according to the disclosed embodiment.

FIG. 9 shows the wing and the telescopic mast folded up, the wing being held by rods 13 possibly provided with retaining lugs 14.

Returning to FIG. 10, suspension lines or guy lines 15 may potentially connect the corners of the wing and the body of the spacecraft bearing the mast and the wing.

The wing is, for example, a constituent part of an antenna, a solar panel, an airbrake sail or solar sail of a spacecraft.

The folding of the space wing comprises a first series of foldings of the membrane in the manner of an accordion or concertina and then a second series of foldings of the membrane in the manner of an accordion.

The folding of the membrane is carried out so as to leave exposed a central square bearing the valve 7 and thus is carried out on the face opposing the face bearing this valve 7.

The foldings are carried out parallel to the diagonals of the square surface of the membrane.

The parts of the membrane on either side of the first diagonal are called wings.

According to the example of FIGS. 5A and 5B, the first series of foldings Pa1 to Pa9 is carried out parallel to a first diagonal 20. It starts by the foldings Pa1 to Pa5 produced in the manner of a concertina on a wing 1a of the membrane 1 on a first side of said first diagonal, said wing being folded onto a band having the width of the strip 3 around said diagonal.

Then the foldings Pa6 to Pa9 of the second wing 1b on the other side of the diagonal 20 are carried out on the first folded wing.

According to FIG. 6A a second series of foldings is produced parallel to an axis 21 corresponding to the second diagonal and in the same manner a first arm 101 is firstly folded in the manner of a concertina along the folds Pb1 to Pb4, then a second arm 102 is in turn folded in the manner of a concertina on the first arm, the valve 7 remaining free since all of the folds are made on a lower face of the membrane.

Moreover, the first series of foldings comprises a first fold on the edge of the strip 3 of the inflatable structure, the subsequent foldings of the first series of foldings leaving said strip exposed.

The second series of foldings comprises a first fold at the edge of a second strip of the inflatable structure, the subsequent foldings leaving a central surface of the membrane exposed, said central surface bearing the end piece for inflating the device.

According to FIG. 6B, the second series of foldings is still made parallel to the axis of the diagonal 21 but the arms 101, 102 are folded together in the manner of a concertina, first foldings Pc1 and Pc2 being produced with the arm 101 which is covered by the arm 102 in the region of the folding Pc3, the arm 102 then being folded at Pc4 and covered in turn by the arm 101 folded at Pc5.

This technique may also be used for the first series of foldings.

According to FIG. 7 a further method is used for the first series of foldings which is carried out over the width corresponding to half increments, one increment being the width of the strip 2.

The first series of foldings starts from a first fold Pd1 parallel to the diagonal along the axis 22 by which a triangular panel 121 of the membrane is folded back onto a second panel 122, the first fold being offset by a first half increment relative to the first diagonal, then comprises folds in the manner of a concertina Pd2 to Pd6 over a band having a width of a ½ increment on a first side of the diagonal 22.

The same is carried out with the second triangular panel 122 folded in the manner of a concertina along the folds Pd7 to Pd12, so that the two panels are folded side-by-side.

The same method is used for the second series of foldings, the arms 131 and 132 being folded in parallel in the manner of a concertina along the folds Pe1 to Pe10.

Thus for the first series of foldings parallel to the first diagonal, the parts or wings of each side of said diagonal may be folded one after the other in a Z-shape as in FIGS. 5A and 5B, side-by-side as in FIG. 7 or together in a similar manner to the folding method of FIG. 6B for the second series of foldings.

The second series of foldings may be carried out in the manner of FIG. 6A, one arm 101 is folded in a Z-shape, then the second arm 102 is in turn folded in a Z-shape, as in FIG. 6B, the arms 101, 102 are applied onto one another and folded together in a Z-shape or finally as in FIG. 8 where the two arms are each folded in a Z-shape in parallel.

It is important that the valve 7 is always on a free surface above the folds and that the folds are perpendicular to the tubes, the inflation thereof deploying the wing.

The folding in the manner of a concertina or double Z-shape enables gas not to be trapped between the folds and permits the device to be placed under vacuum without creating pockets of gas.

Once folded, the sail may be stored in a small space under vacuum. The deployment of the sail is obtained by simply inflating the space between the sail and the strips adhesively bonded along the diagonals.

The production of the wing comprises the adhesive bonding of the contour of the inflation strips directly on the membrane forming the wing along the diagonals of the wing, this adhesive bonding of the membrane/strips producing bladders permitting the deployment of the wing.

In the case of the example of FIG. 1, the adhesive bonding of the inflation strips is made on either side of the sail for the purpose of facilitating the production and improving the seal of the inflatable structure, producing a bladder on the upper face and a bladder on the lower face of the planar surface.

Then the folding is carried out, and the combination of the folding in a double Z-shape along the diagonals and the adhesive bonding of the bladders in the region of the diagonals permits a two-stage deployment of the wing without blockage, by the first bladder inflating and deploying the first Z-shape and then the second bladder inflating to deploy the second Z-shape.

In the first stage, the second bladder does not inflate due to the geometry of the first Z-shape which prevents the inflation of the second Z-shape.

One aspect is a sail for deorbiting a satellite of the Cubesat type by means of airbraking, namely a small satellite constructed by means of elements having sides of 10×10×10 cm and currently used by universities worldwide.

The deorbiting sail consists of a square membrane of 5 m×5 m which is stored in a cube having 10×10×10 cm sides.

The production starts by cutting out the 5 m×5 m square membrane, then by marking the folds along the diagonals.

Then a patch of adhesive tape is placed in the center of the sail and a hole having a diameter of approximately 8 mm is made in the center of the patch.

The production continues by cutting out a strip 3 of 1.2 m in length and adhesively bonding this strip to a lower face of the membrane on a diagonal.

Then a second strip 2 is cut out, identical to the first strip, a hole of approximately 8 mm is made in the center of this strip to position an inflation valve 7 in the region of this hole in the second strip, the second strip is then adhesively bonded to the upper side of the membrane 1 along the diagonal which has been left free.

Once the sail is finished, it is folded in a double Z-shape along the line of the folds parallel to the diagonals of the sail and then the end piece 6 of the valve 7 is fixed to the end of the rigid telescopic arm 8.

The sail is thus fixed to the end of a single rigid mast which is an advantage of the disclosed embodiment.

The disclosed emodiment more generally relates to a polygonal membrane provided with inflatable tubes, wherein two folding directions are defined according to the position of the tubes.

The type of polygon which is able to be used is a convex polygon, wherein the strips extend over diagonals passing through the center of the polygon or through a single point of intersection.

The inflatable tubes extend in the direction of the apexes of the polygon formed by the membrane to deploy it progressively.

Figure 11:
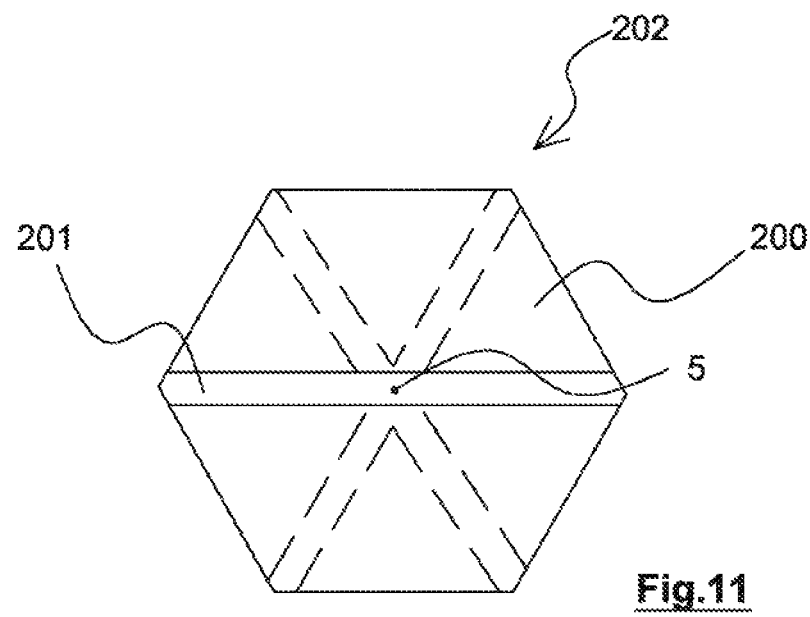
FIG. 11 shows a view from above of an example of a polygonal sail.

FIG. 11 corresponds to an example of a hexagonal membrane 200 comprising a first tube 201 on a first face of the membrane and connecting two opposing apexes of the hexagon relative to the center of the membrane and a second cross-shaped tube 202 on a second face of the membrane and joining the four other apexes of the hexagon.

Figure 12:
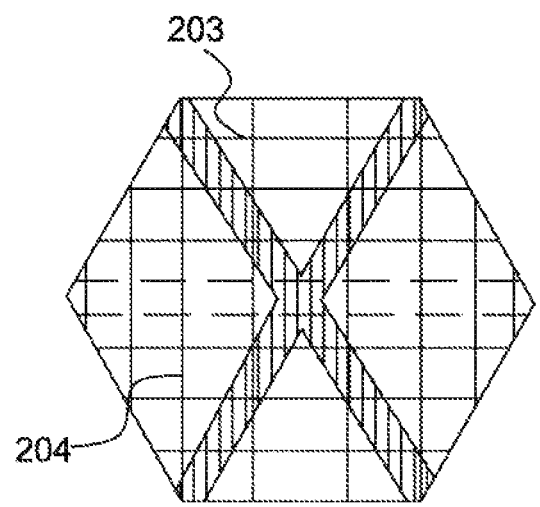
FIG. 12 shows a view from below of the sail of FIG. 11 in which the fold lines are shown.

In this case, the folding is shown in FIG. 12 and the first folds 203 shown by lines parallel to the first tube 201 permit the sides to be filled on either side of the first tube along an intermediate axis between the axes of the cross-shaped tubes, whilst the second folds 204 perpendicular to the direction of the first tube permit the sail to be folded in the axis of the first tube.

The unfolding preferably takes place along the folds produced last, along the tube which is the least restricted by the folding.

Figure 13:
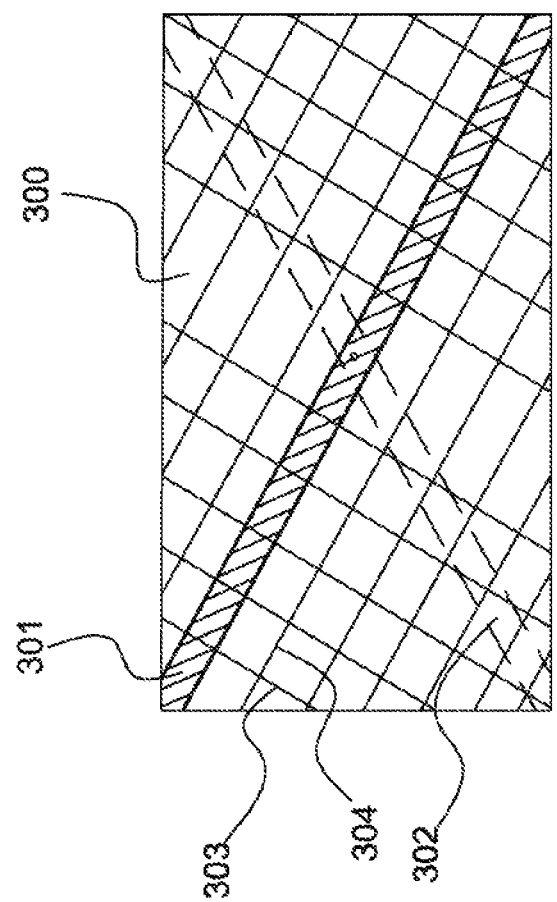
FIG. 13 shows a view from above of a rectangular wing in which the fold lines are shown.

FIG. 13 corresponds to a rectangular sail 300 provided with two inflatable tubes 301 and 302 along two diagonals.

For this aspect, first folds 303 perpendicular to the first tube 301 provide a first folding direction and second folds parallel to the first tube 301 provide a second folding direction. In this aspect, the second folds are not oriented at 90° from the second tube which will be deployed in a less uniform manner than for a square sail, for example.

The disclosed embodiment may also be applied to solar sails, flexible solar panels, solar screens or other planar devices deployed in space.

During the flight, the sail is held under tension, for example by maintaining a light pressure in the tubes.

For more extended use, known stiffening techniques could be used without maintaining pressure, such as for example the technique consistent with using membranes provided with an aluminum film.

What is claimed is:

1. A space wing produced by means of a membrane, said membrane forming a polygonal surface provided with an inflatable structure which comprises ribs extending over the membrane along diagonals of the membrane and passing through a central point of the membrane, wherein the inflatable structure comprises at least one film strip, a contour thereof being adhesively bonded to the membrane so as to form an inflatable volume with the membrane and to produce extension ribs of the membrane, wherein the membrane is previously folded during the launching of a satellite or spacecraft and which is deployed once the satellite or spacecraft is in space so as to obtain a large surface.

2. The space wing as claimed in claim 1, wherein the polygonal membrane is unfolded by means of an inflatable structure comprising at least two film strips, a first strip being adhesively bonded to a first face of the membrane on a first diagonal of the membrane, said first strip and the membrane below said first strip forming a first inflatable tube, and a second strip being adhesively bonded to a second face of the membrane opposing said first face on one or more second diagonals of the membrane, the second strip and the membrane below said second strip forming a second inflatable tube.

3. The space wing as claimed in claim 2, wherein the membrane is perforated in a center of the polygon surface to place the first and second inflatable tubes in communication with one another.

4. The space wing as claimed in claim 1, wherein at least one film strip comprises a cut-out adhesively bonded to a face of the membrane on diagonals of the membrane, said at least one flim strip comprising the cross-shaped cut-out and the membrane below said at least on film strip comprising the cross-shaped cut-out forming an inflatable tube.

5. The space wing as claimed in claim 1, wherein the inflatable structure is produced from a square membrane and comprises two film strips, a first strip being adhesively bonded to a first face of the membrane on a first diagonal of the square membrane, said first strip and the membrane below said first strip forming a first inflatable tube and a second strip being adhesively bonded to a second face of the membrane opposing said first face on a second diagonal of the square membrane, the second strip and the membrane below said second strip forming a second inflatable tube.

6. The space wing as claimed in claim 5, wherein the square membrane is perforated at a center of the square membrane to place the first and second inflatable tubes in communication with one another.

7. The space wing as claimed in claim 1, wherein the inflatable structure is produced from a membrane having a square surface and a cross-shaped film strip adhesively bonded to a face of the membrane on the diagonals of the square surface, said cross-shaped film strip and the membrane below said cross-shaped film strip forming an inflatable tube.

8. The space wing as claimed in claim 1, wherein the inflatable structure comprises an inflating device in a center of the inflatable structure.

9. The space wing as claimed in claim 8, wherein the inflating device comprises a valve and a tubular end piece perpendicular to the membrane and which is fixed to one of the at least one film strip.

10. The space wing as claimed in claim 9, wherein the tubular end piece extends a telescopic mast for deployment of the space wing.

11. The space wing as claimed in claim 1, wherein the space wing is a part of an antenna, a solar panel, an airbrake sail or a solar sail of a spacecraft.

12. A method for folding a space wing as claimed in claim 1, wherein said method comprises a first series of foldings of the membrane in the manner of a concertina, parallel to a first diagonal of the membrane until a band is produced about said first diagonal, then a second series of foldings of the membrane in the manner of a concertina, perpendicular to said first diagonal until an overlapping surface of sat least one film strip on the membrane is left visible, said overlapping surface bearing an end piece for inflating the inflatable structure.

13. The method for folding a space wing as claimed in claim 12, wherein the first series of foldings is carried out parallel to the first diagonal, said method starts by folding a first wing of the membrane in the manner of a concertina on a first side of said first diagonal by means of foldings which fold said first wing on a band having a width of a strip about said first diagonal and the method is terminated by folding a second wing in the manner of a concertina on the other side of the first diagonal by means of foldings which fold the second wing on the first folded wing.

14. The method for folding a space wing as claimed in claim 13, wherein the first series of foldings is carried out parallel to an axis of the first diagonal and the first wing and the second wings are folded together in the manner of a concertina.

15. The method for folding a space wing as claimed in claim 12, wherein as one increment corresponds to a width of a strip arranged on the first diagonal, the first series of foldings comprises the folding of a first wing along the folds in the manner of a concertina parallel to the first diagonal on a band having a width of half an increment on a first side of the first diagonal, the first series of foldings comprising the folding of a second wing along the folds in the manner of a concertina on a band having a width of half an increment on a second side of the first diagonal so that the first wing and the second wings are folded side-by-side.

16. The method for folding a space wing as claimed in claim 12, wherein the second series of foldings is carried out perpendicular to the first diagonal, arms of the band on either side of a second diagonal being folded together in the manner of a concertina.

17. The method for folding a space wing as claimed in claim 12, wherein the second series of foldings is carried out parallel to a second diagonal and comprises the folding of a first arm along the folds in the manner of a concertina and then the folding of a second arm along the folds on the first arm in the manner of a concertina.

18. The method for folding a space wing as claimed in claim 12, wherein the second series of foldings comprises a separate folding in parallel with arms, on either side of the first diagonal along the folds in the manner of a concertina.

* * * * *